US008856492B2

(12) United States Patent
Smriti et al.

(10) Patent No.: US 8,856,492 B2
(45) Date of Patent: Oct. 7, 2014

(54) METHOD FOR VECTOR PROCESSING

(75) Inventors: Mahima Smriti, Bangalore (IN); Jean-Paul Charles Francois Hubert Smeets, Eindhoven (NL); Willem Egbert Hendrik Kloosterhuis, Waalre (NL)

(73) Assignee: NXP B.V., Eindhoven (NL)

( * ) Notice: Subject to any disclaimer, the term of this patent is extended or adjusted under 35 U.S.C. 154(b) by 502 days.

(21) Appl. No.: 12/995,322

(22) PCT Filed: May 29, 2009

(86) PCT No.: PCT/IB2009/052278
§ 371 (c)(1),
(2), (4) Date: Feb. 22, 2011

(87) PCT Pub. No.: WO2009/144683
PCT Pub. Date: Dec. 3, 2009

(65) Prior Publication Data
US 2011/0314254 A1  Dec. 22, 2011

(30) Foreign Application Priority Data
May 30, 2008 (EP) .................................. 08157299

(51) Int. Cl.
G06F 9/30 (2006.01)

(52) U.S. Cl.
CPC .......... *G06F 9/3001* (2013.01); *G06F 9/30036* (2013.01); *G06F 9/30029* (2013.01)
USPC ............................................................ 712/7

(58) Field of Classification Search
CPC ................................................... G06F 9/30036
USPC ............................................................ 712/7
See application file for complete search history.

(56) References Cited

U.S. PATENT DOCUMENTS

| 6,377,970 | B1 | 4/2002 | Abdallah et al. |
| 6,961,845 | B2 * | 11/2005 | Roussel .......................... 712/221 |
| 7,441,104 | B2 * | 10/2008 | Morris ............................. 712/213 |
| 8,510,534 | B2 * | 8/2013 | Van Berkel et al. ............... 712/3 |
| 2004/0059889 | A1 | 3/2004 | Macy et al. |
| 2004/0193847 | A1 * | 9/2004 | Lee et al. ....................... 712/221 |
| 2005/0149701 | A1 | 7/2005 | Chen et al. |

* cited by examiner

*Primary Examiner* — Andrew Caldwell
*Assistant Examiner* — Benjamin Geib

(57) ABSTRACT

The present application relates to a method for processing data in a vector processor. The present application relates also to a vector processor for performing said method and a cellular communication device comprising said vector processor. The method for processing data in a vector processor comprises executing segmented operations on a segment of a vector for generating results, collecting the results of the segmented operations, and delivering the results in a result vector in such a way that subsequent operations remain processing in vector mode.

12 Claims, 3 Drawing Sheets

Prior Art

METHOD FOR VECTOR PROCESSING

FIELD OF THE INVENTION

The present application relates to a method for processing data in a vector processor. The present application relates also to a vector processor for performing said method and a cellular communication device comprising said vector processor.

BACKGROUND OF THE INVENTION

In current high-performance processor architectures, increasing performance by increasing clock frequency is reaching its limits due to physical limitations. Instead, other methods of increasing the performance are being exploited. One of the methods to do so is to increase the parallelism, i.e. the number of operations performed in parallel in a single clock cycle. Thereby, the single clock cycle may be the basic timing unit of a processor.

A familiar way to increase the parallelism is to exploit the Single Instruction, Multiple Data (SIMD) concept. In such SIMD processors, each single instruction acts on multiple data values simultaneously, performing the same operation on each of them. This is performed by a SIMD processor which may operate on fixed-length vectors. The fixed-length vectors may be also called rows or arrays and may comprise a number of data elements. For example, a 16-bit SIMD machine of width 32 works on rows of 32 elements, each being a 16-bit number, i.e. processes 32*16=5612 bits at once.

Operations will take arguments from the vector(s) according to the position within the vector, and generate a result. The result may be put either into an existing vector, as in case of the exemplified operation A=−A, or in a new vector as in case of the exemplified operation C=A+B, where A, B and C are vectors. For both cases, the computed elements of the result vector are located on the same position within this result vector, i.e. C[0]=A[0]+B[0], etc.

In FIG. 1, a first exemplified operation according to prior art is shown. A first vector 2 comprises the elements A[i], where i=1, . . . , N, and a second vector 4 comprises the elements B[i], where i=1, . . . , N. According to the shown example, the SIMD instruction is an adding function, wherein adding is performed in a pair-wise fashion corresponding elements of two of such vectors 2 and 4, result in a third result vector 6. For all i within the vector length, the result vector is computed according to following equation $$C[i]=A[i]+B[i].$$

It shall be understood that the SIMD operations are not limited to adding functions and that SIMD operations includes all element-wise functions.

An extension of the idea of a SIMD processor is the so-called vector processor. In addition to the capability of performing SIMD operations, the vector processor may be able to perform also so-called intra-vector operations. Intra-vector operations are operations which have interaction between the elements within a single vector. An example of such an operation is the calculation of the sum of elements within a vector. Such an operation cannot be performed as parallel operation on a pure SIMD machine, as such machines only operate on elements on the same position within the vectors. By way of example, intra-vector operations are addition of elements within a vector, which can be also called vector intra-add, finding the maximum or minimum element within a vector, and rearranging or permuting elements within a vector.

FIG. 2 shows a second exemplified operation according to prior art. More particularly, FIG. 2 illustrates an intra-operation on a complete vector. As can be seen from this Figure, the input elements in[i], i=0, . . . , 7, of vector 8 are summed and the result s0 is put into field 10.

A third exemplified operation according to prior art is depicted in FIG. 3. FIG. 3 gives an example of an intra-add operation on a segmented vector 12. The illustrated vector 12 is divided into a first segment 14 comprising the elements A[i], i=1, . . . , 4, and further segments indicated by reference sign 16 comprising the elements A[i], i=5, . . . , N. The elements of each segment 14 and 16 can be summed and put into respective result fields 18 and 20.

The concept of SIMD operations, and of intra-vector operations, is already well known in computing architectures. However, when mapping an algorithm on a vector processor, the length of the vectors in the processor do not always match the length of the data segments (chunks) that have to be processed in the algorithm. For example, consider a use case where the native vector length comprises a value of sixteen. However, the algorithm may divide the input-stream into segments of eight adjacent elements, which have to be accumulated. This is a typical situation in e.g. cellular communications based on Rake receivers, wherein the rake has a small spreading factor. According to the present example, the spreading factor is eight.

A simple vector intra-add operation according to FIG. 2 does not suffice to implement such an algorithm efficiently, as it will add all elements within a vector. Hence, in order to use a standard (full-width) intra-add, in a separate operation at first all elements, which do not belong to a particular segment, have to be zeroed, before the intra-vector addition is performed. Additionally, this process has to be repeated for each segment within the vector. Finally, it is likely the results have to be repacked in a result vector, to deliver the computed values in adjacent elements for further processing.

A segmented intra-add operation according to FIG. 3 provides a way to compute the partial sums efficiently, it does however not provide a way to collect the results in an efficient way. Further it only provides a solution for segment lengths that are a divisor of the vector length.

Therefore, it is an object of the present application to provide a method wherein the segment length is unlimited. Another object is to provide a method for collecting the result output stream in an efficient way. A further object is to improve the efficiency of the vector processor.

SUMMARY OF THE INVENTION

These and other objects are solved by a method for processing data in a vector processor comprising executing segmented operations on a segment of a vector for generating results, collecting the results of the segmented operations, and delivering the results in a result vector in such a way that subsequent operations remain processing in vector mode.

According to the present application data are processed. More particularly, data of a segment is processed. A segment of a vector comprises a number of elements which in turn comprises data. By executing segmented operations, results are produced. It is found according to the present application that the efficiency of the vector processor is improved by delivering the results in a result vector in such a way that subsequent operations remain processing in vector mode. Delivering the results in a result vector allows processing the results immediately. It is not necessary to change the mode of the vector processor for further processing a result from an intra-vector operation. Avoiding mode changes or additional instructions results in a faster processing.

According to another embodiment of the present application the method may comprise collecting the result of the segmented operation such that processing is performed at the rate of one vector per operation. Fast processing can be ensured.

Furthermore, the results can be delivered as adjacent elements in a result vector according to an embodiment. The result vector may act as a conveyor belt. A predefined order in a result vector can be ensured. Further processing of the collected results can be eased due to the predefined result.

Moreover, in each operation a single result can be generated. The result can be delivered into a result vector as previously described. The result vector can be used according to a further embodiment of the present application for further processing after detecting a full result vector. In case of processing segments of equal length, it can be predictable when the conveyor belt and result vector respectively is full. In case of varying segment sizes this detecting process is not possible. According to the present application, a mechanism can be provided to detect that the conveyor belt and result vector respectively is full or contains enough data to fill a complete vector and take an appropriate action in that case. For example, a Boolean state can be set, or a vector can be automatically flushed to memory. Simple detecting of a full result vector for enabling further processing in an easy manner is provided.

What is more, the segmented operation may be an intra-vector operation. The segmented operation may be at least an adding operation, an extremal value operation, an XOR operation, an OR operation or an AND operation. All these operations may be intra-vector operations. Extremal value operation may include intra-max/min operation and infra-max/min which includes the location where the max/min value resides. In this case the "acc" result has to contain more information than just the max/min value. Further operation may be an add function with precision increase, e.g. sign extension from 8 to 16 bits, add function with saturation or intra subtract operation, like negate and add. The processing time for these operations can be improved.

According to another embodiment, the size of the segment is arbitrary. This includes that the segment size is equal to the vector size, smaller than the vector size or larger than the vector size. It may be possible that a segment extents over vector boundaries. A flexible executing on segments differing in their sizes is provided.

Furthermore, the method may comprise, according to another embodiment, implementing a segmented operation on a programmable core. According to another embodiment of the present application, a segmented operation on a programmable core is implemented at least by dedicated opcodes, extra arguments and/or internal state machine. In a programmable core it is possible to give all those operations dedicated opcodes. For the simple cases that is feasible. Opcodes can be also used for the cases with identical segment lengths. For varying segment lengths and for arbitrary segment lengths this becomes more or less unfeasible. Providing extra arguments is always an option. Those can be immediate, or from registers. For the regular cases, where subsequent segments of identical size have to be processed, an internal state machine is a good solution to reduce program size. For example, if the operation knows the segment length, then it is sufficient if the state contains the relative position of the current vector to the segment in which its first element resides. From this the complete addition and shifting, and the next state, can be derived. Simple possibilities for implementing the operations are provided.

Another aspect of the present application is a vector processor for performing the method as stated above. The vector processor may support both inter-vector operations and intra-vector operations. The inter-vector operations are so-called SIMD operations, e.g. element-wise addition of all elements of two vectors. The intra-vector operations provide e.g. addition of all elements within the same vector, and as such operate on the full width of the vectors. The intra-vector operations are introduced to cover more algorithms than are possible with pure SIMD. The application describes an intra-operation scheme that allows to process segments of input elements, which in size do not have to correspond to entire vectors. In the generalized version, arbitrary segment sizes are allowed.

A further aspect of the present application is a cellular communication device comprising a vector processor as stated above.

The method according to the present application provides for efficiently processing segments of data not mapping natively on the vector length of the processor, and for collecting the results in an efficient way. The application proposes a method of executing segmented operations, combined with a method to collect the results in such a way that processing can be performed at the rate of one vector per operation, and results are delivered as adjacent elements in a result vector in such a way that subsequent operations can remain processing in vector mode. Thereby, a vector mode results in no holes in the result vector, as would be the case with the segmented operations according to prior art.

These and other aspects of the present patent application become apparent from and will be elucidated with reference to the following Figures. The features of the present application and of its exemplary embodiments as presented above are understood to be disclosed also in all possible combinations with each other.

BRIEF DESCRIPTION OF THE DRAWINGS

In the figures show.

Like reference numerals in different figures indicate like elements.

DETAILED DESCRIPTION OF THE DRAWINGS

In the following detailed description of the present application, exemplary embodiments of the present application will describe and point out a method for processing data in a vector processor, which provides for improved efficiency.

For a simple illustration, in the following examples the adding operation is chosen for demonstrating the method according to the present application. It shall be understood that, according to other variants of the present application, any operation can be performed using the method of the present application.

Figure 4:
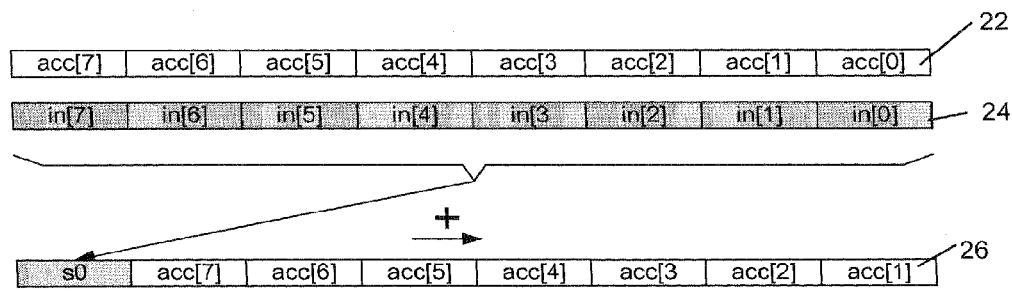
FIG. 4 a first exemplified operation according to the method of the present application.

FIG. 4 shows a first exemplified operation according to the method of the present application. A first vector 22 and a second vector 24 are depicted. The first vector 22 may be the result vector and the second vector 24 may be the source or input vector comprising the input elements to be processed. In the present case the data segment size is equal to the vector size.

As can be seen from FIG. 4, the input elements in[i], i= 0, . . . , 7, of the vector 24 are summed and the result is collected in a special way. More particularly, results can be collected into the result vector 26, when iterating this operation over multiple vectors. In other words, the present method works in a similar manner like conveyor belt. In each operation, the intra-vector unit generates a single result. At the same time, the vector 22 collecting the results is shifted over one element, freeing up one element at the beginning of the vector 22. At the end of the operation, the newly computed value is placed in the now empty new location, as shown in FIG. 4. This conveyor belt or result vector 24 typically comprises the normal vector length and can be flushed when it is full, e.g. every vector length operations. Merely one clock cycle may be required for the operation and the throughput may be one (or limited) independent of the vector length. Summing, shifting and putting the result into the respective field can be performed during one clock cycle.

Furthermore, different possibilities for detecting a full conveyor belt or result vector exist. In case of processing segments of equal length, it is predictable when the conveyor belt is full. In case of varying segment sizes not. A mechanism can be provided to detect that the conveyor belt or result vector is full or contains enough data to fill a complete vector and take an appropriate action in that case. For example, a Boolean state can be set, or a vector can be automatically flushed to memory.

It shall be understood that, according to further variants, the length of the input vector 24 and the result vector 22 or 26 may be different.

Figure 5:
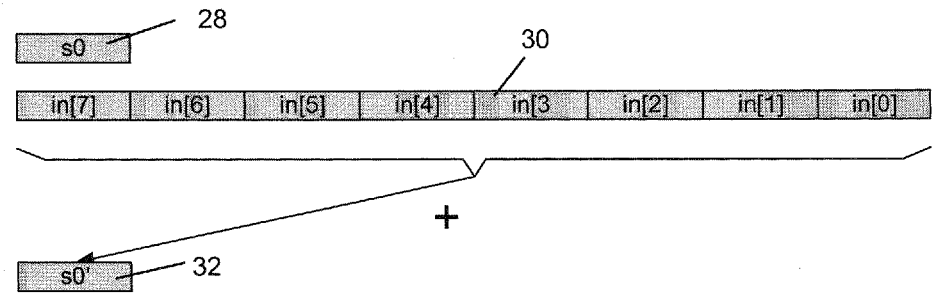
FIG. 5 a second exemplified operation according to the method of the present application.

In FIG. 5 a second exemplified operation according to the method of the present application is depicted. For directing the attention to another feature of the method according to the present application, merely one field 28 or 32 of each result vector is shown.

In addition to the above mentioned fields 28 and 32, a vector 30 is illustrated. The idea demonstrated in FIG. 5 is to support an operation that includes at least a partial result of the previous vectors in the current computation. More particularly, field 28 comprises the result of a previously performed operation, such as the operation shown in FIG. 4. The present operation adds the elements of the vector 30 and accumulates the result with the partial sum s0 that was kept in field 28 result in the value s0' in field 32.

Figure 1:
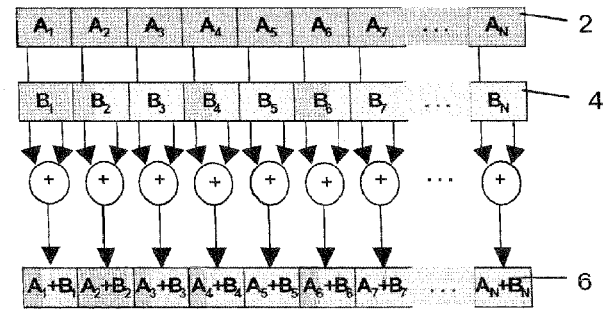
FIG. 1 a first exemplified operation according to prior art.
Figure 2:
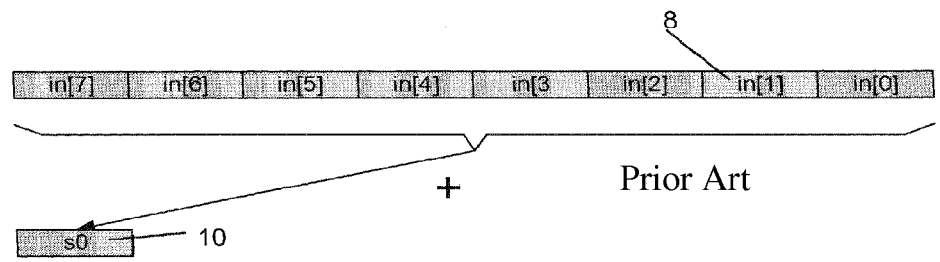
FIG. 2 a second exemplified operation according to prior art.
Figure 3:
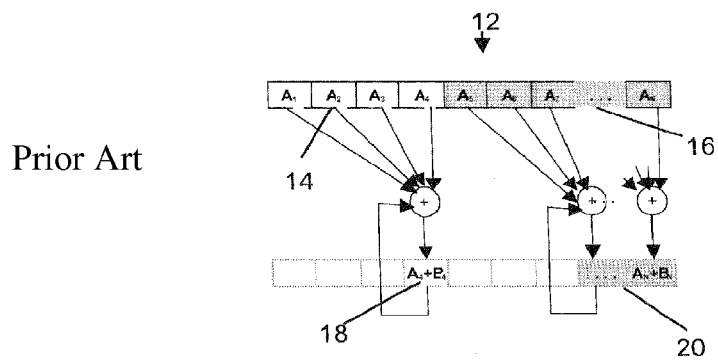
FIG. 3 a third exemplified operation according to prior art.

For example, for a segment that covers four vectors, as a first operation the operation according to FIG. 2 can be used, and then three times the operation according to FIG. 5 can be used. Alternatively, the value s0 in field 28 can be initialized to a "neutral value", such as zero in case of an addition operation, after which four times the operation according to FIG. 5 can be executed. This does, however, require one additional initialization operation.

Figure 6:
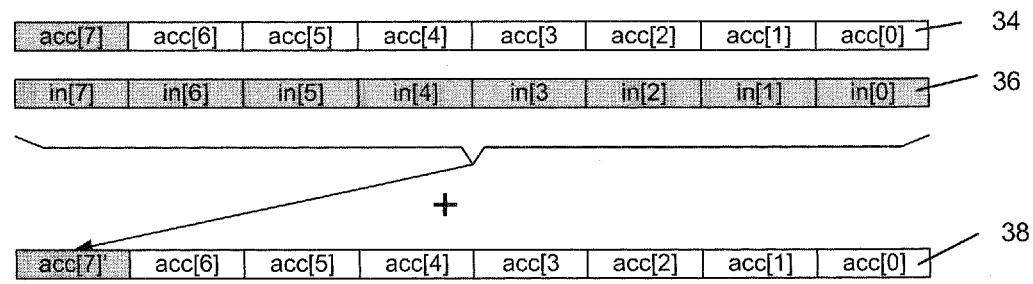
FIG. 6 a third exemplified operation according to the method of the present application.

Similarly the conveyor belt method according to FIG. 4 can be generalized to apply it on segments that cover multiple vectors. The machine processes a single segment consisting of multiple vectors of data by iterating over this segment in vector-sized steps. Only in the first step the result vector is shifted to generate a new receiving entry and the newly available element is set to the initial value, e.g. zero for addition. In subsequent steps, this new value is reused as extra input into the intra-vector operation to be performed. Such a method is shown in FIG. 6. FIG. 6 merely shows the result vector 34 or 38, which indicates that the operation is already performed, and the input vector 36. According to this way, a multi-vector result can be accumulated.

For example, supporting segments of size four times the vector length, one initial operation, according to FIG. 4, will be executed while simultaneously shifting the result and freeing/initializing one new location. This operation will be followed by three subsequent operations, according to FIG. 6, over the remaining data and including the result of the previous step. The final result acc[7]' is now available in the result vector 38.

Figure 7:
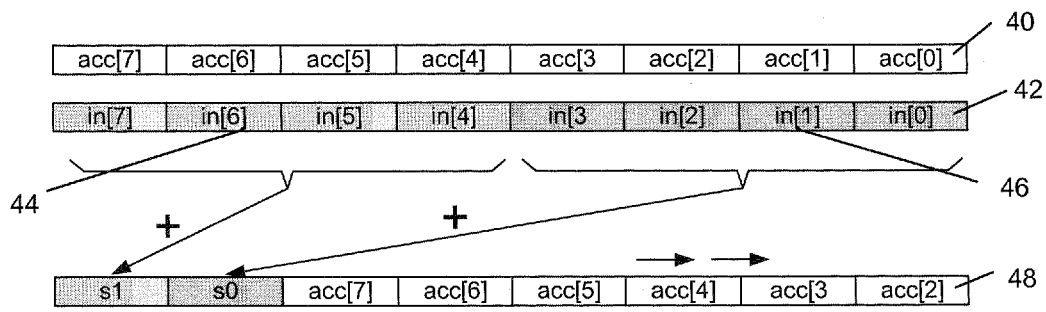
FIG. 7 a fourth exemplified operation according to the method of the present application.

The method illustrated by means of FIG. 4 can be also used in case the segment size is smaller than the vector size. In FIG. 7, a fourth exemplified operation according to the method of the present application points out this case. As can be seen from FIG. 7, a result vector 40 or 48 is depicted. Furthermore, a vector 42 is shown divided into a first segment 44 with the input values in[i], i=4, . . . , 7 and a second segment 46 with the input values in[i], i=0, . . . , 3.

The main difference compared to the method shown in FIG. 4 is that in this situation, the result vector 48 has to shift and free more locations, namely the number of segments per vector, and to initialize them accordingly. No iteration over multiple cycles is needed, as the segments fit within a single vector, and are thus completely processed in a single operation. According to the present embodiment, the result vector 48 is shifted by two and the summing result of the first segment 44 is s1 and the summing result of the second segment 46 is s0.

FIG. 7 illustrates summing the values within segments consisting of four data values each, on a machine with eight elements per vector. Each instruction, two new segments are summed, and shifted into the result vector 48. After four such cycles, the result vector is filled with computed data of eight segments, and needs to be flushed or used on subsequent processing steps before processing the next eight segments.

Figure 8:
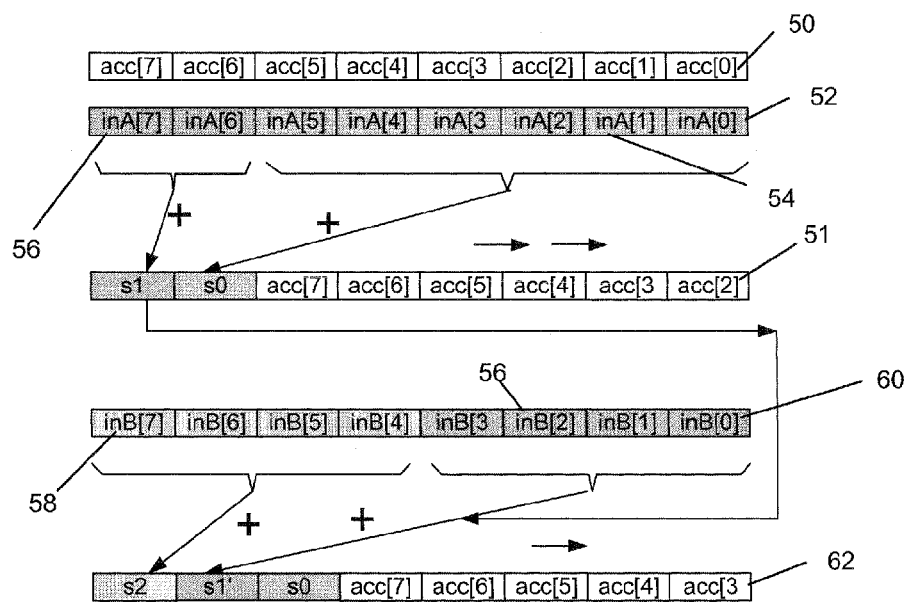
FIG. 8 a fifth exemplified operation according to the method of the present application.

In the general case, the segment sizes may differ from segment to segment, and there is no relation between segment boundaries and vector boundaries. FIG. 8 shows a fifth exemplified operation according to the method of the present application. This exemplified operation elucidates the previously stated case. In FIG. 8, a result vector 50 in a first state, the result vector 51 in a subsequent state and the result vector 62 in the final state are shown. Furthermore, two input vectors 52 and 60 are provided.

The two vectors 52 and 60 are divided into three segments 54, 56 and 58. The first segment 54 is included within vector 52 and comprises the input elements A[0] . . . A[5]. The third segment 58 is included within vector 60 and comprises the input elements B[4] . . . B[7]. The second segment 56 extends the vector boundary. More particularly, the second segment 56 is included within vector 52 and vector 60 and comprises the input elements A[6], A[7] and B[0] . . . B[3].

This implies that the result s0, the sum of A[0] . . . A[5] is the complete sum of the first segment 54. This result can be obtained in a first single cycle as well as value s1, which is the sum of A[6] . . . A[7]. However, this value s1 is only the sum of one part of the second segment 56. In the second operation it is accumulated with B[0] . . . B[3] to form the final sum s1' of the second segment 56. In parallel the sum s2 of B[4] ... B[7] or the sum s2 of the third segment 58 is computed. As can be seen from FIG. 8, the result vector 62 is shifted three times.

It shall be understood that, according to other variants of the present application, the contents in the result vector or conveyor belt will not fill up exactly to a complete vector size. Hence, for supporting vector-wise flushing of the conveyor belt it has to be longer than the complete vector size.

All cases up-to-now describe the case in which the subsequent input vectors contain one input stream that has to be processed. As an extension according to the present application, it is possible to support interleaved input streams. For example, if two input streams are multiplexed, a stream A may occupy the first four elements of each vector and a stream B may occupy the last four elements of each vector. Both may comprise a segment size, which has to be covered of twelve elements.

Figure 9:
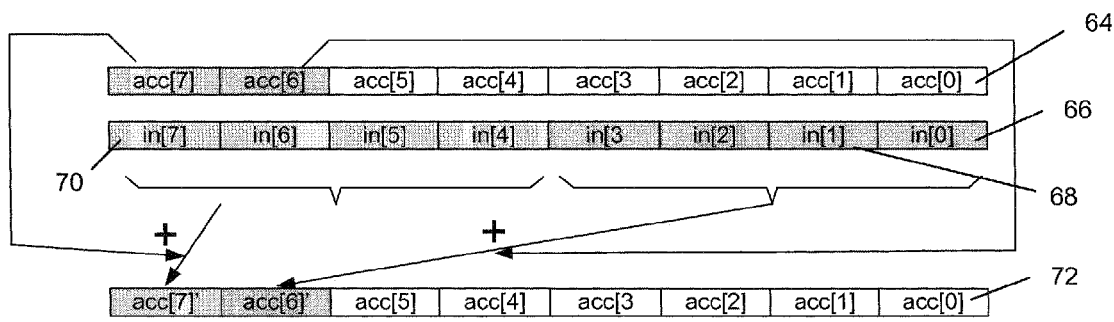
FIG. 9 a sixth exemplified operation according to the method of the present application.

Such a case can be performed by the aid of a method according to FIG. 9. FIG. 9 shows a sixth exemplified operation according to the method of the present application. A result vector 64 or 72 and an input vector 66 having two segments 68 and 70 are depicted. As can be seen from FIG. 9, the first segment 68 is accumulated to value acc[6] result in the value acc[6]' and the second segment is accumulated to value acc[7] result in the value acc[7]'.

In the case of a stream A and a stream B, the operations according to FIG. 7 and FIG. 9 can be combined. More particularly, at first the method according to FIG. 7 may be performed and subsequently the operation according to FIG. 9 can be performed twice. This will produce a segment sum for both input streams A and B after each three operations. Each time the operation according to FIG. 7 starts, two new segment sums by adding the first four numbers in each segment, which is completed by two times an accumulation of four numbers, with the operation according to FIG. 9.

It shall be understood that instead of shifting the result vector, as a conveyor belt, it is also possible to let successive intra-operations dump their results at distinct locations of the result vector. For example starting at location zero, then location1, etc., to get the results in the same order as the conveyor belt does.

It is remarked that the scope of protection of the application is not restricted to the embodiments described herein. Neither is the scope of protection of the application restricted by the reference symbols in the claims. The word 'comprising' does not exclude other parts than those mentioned in a claim. The word 'a(n)' preceding an element does not exclude a plurality of those elements. Means forming part of the application may both be implemented in the form of dedicated hardware or in the form of a programmed general-purpose processor. The application resides in each new feature or combination of features.

The invention claimed is:

1. A method for processing data in a vector processor, comprising:
    executing segmented operations on a segment of a vector for generating results,
    collecting the results of the segmented operations, and
    delivering the results in a result vector in such a way that subsequent operations remain processing in vector mode, thereby providing a result vector where results are stored in a continuous sequence of adjacent elements in the result vector, wherein the delivering includes shifting the result vector by a number (N) of elements equal to the number of the results of the segmented operations, thereby shifting out N elements of the result vector and creating N unused elements of the result vector, wherein in the collecting the results of the segmented operations, a processing is performed at a rate of one vector per operation and the delivering further including storing the results of the segmented operations in the unused elements of the results vector.

2. The method according to claim 1, wherein the results are delivered as adjacent elements in the unused elements in the result vector.

3. The method according to claim 1, wherein in each operation a single result is generated.

4. The method according to claim 1, further comprising using the result vector for further processing after detecting a full result vector.

5. The method according to claim 4, wherein a segmented operation on a programmable core is implemented at least by one of:
    dedicated opcodes,
    extra arguments, and
    an internal state machine.

6. The method according to claim 1, wherein the segmented operation is an intra-vector operation.

7. The method according to claim 1, wherein the segmented operation is at least one of:
    an adding operation,
    an extremal value operation,
    an XOR operation,
    an OR operation, and
    an AND operation.

8. The method according to claim 1, wherein a size of the segment is arbitrary.

9. The method according to claim 1, further comprising implementing a segmented operation on a programmable core.

10. A method for processing data in a vector processor, comprising:
    executing intra-vector operations on a first segment of a input vector to produce a first set of results;
    executing intra-vector operations on a second segment of the input vector to produce a second set of results, the first and second sets of results including a total of number (N) of elements;
    shifting a results vector by N elements equal, thereby shifting out N elements of the results vector and creating N unused elements of the results vector; and
    storing the first and second sets of results in the unused elements of the results vector.

11. The method of claim 10, wherein:
    the first segment includes a number (X) of elements;
    the input vector includes a number (Y) of elements; and
    Y is not divisible by X.

12. The method of claim 10, wherein:
    the first segment includes a number (X) of elements;
    the second segment a number (Z) of elements; and
    X is not equal to Z.

* * * * *